Dec. 16, 1952  E. ANDERSON  2,621,757

EXTENDIBLE AND COLLAPSIBLE FILTER BAG

Filed Nov. 28, 1947  4 Sheets-Sheet 1

INVENTOR.
EMIL ANDERSON
BY Thomas C. Betts
  his ATTORNEY.

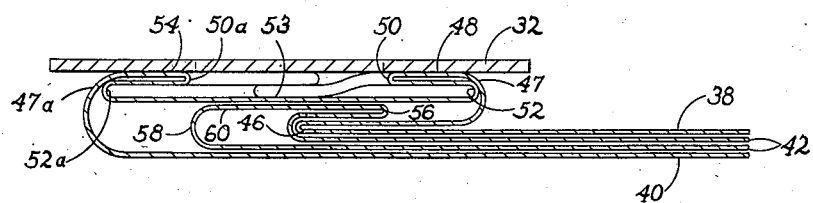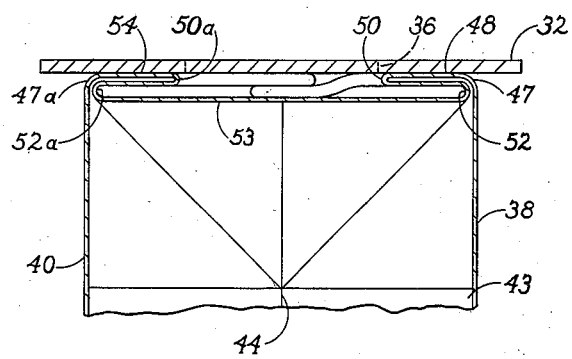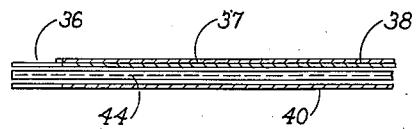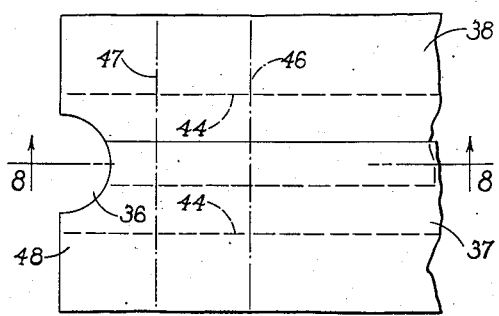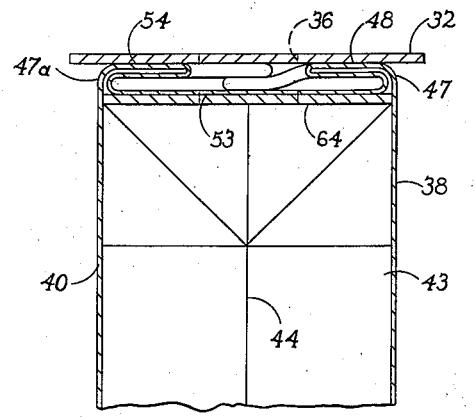

Dec. 16, 1952  E. ANDERSON  2,621,757
EXTENDIBLE AND COLLAPSIBLE FILTER BAG
Filed Nov. 28, 1947  4 Sheets-Sheet 3

INVENTOR.
EMIL ANDERSON
BY Thomas C. Betts
His ATTORNEY.

Dec. 16, 1952           E. ANDERSON           2,621,757

EXTENDIBLE AND COLLAPSIBLE FILTER BAG

Filed Nov. 28, 1947           4 Sheets-Sheet 4

INVENTOR.
EMIL ANDERSON
BY Thomas C. Betts
his ATTORNEY.

Patented Dec. 16, 1952

2,621,757

UNITED STATES PATENT OFFICE 2,621,757

EXTENDIBLE AND COLLAPSIBLE FILTER BAG

Emil Anderson, Briarcliff Manor, New York, N. Y., assignor to Electrolux Corporation, Old Greenwich, Conn., a corporation of Delaware Application November 28, 1947, Serial No. 788,457

1 Claim. (Cl. 183—51)

My invention relates to extendable and collapsible containers of flexible material, and more particularly to containers of this type adapted for use in a vacuum cleaner for the purpose of separating dirt from air and retaining the dirt.

Among the objects of my invention is to provide a low cost container of this type, preferably made chiefly of paper which is pervious with respect to air but impervious with respect to dust, so that it will be economical to dispose of the containers when they become filled with dirt, thus obviating the necessity of emptying them.

Another object of my invention is to provide a container of this type having a relatively stiff plate member at one end thereof which may serve to secure the container in place within the vacuum cleaner.

A still further object of my invention is to provide a container of this type which, when in collapsed condition, occupies a minimum of space so as to facilitate storage of containers.

Further objects and advantages of my invention will be apparent from a consideration of the following specification taken in conjunction with the accompanying drawings in which:

Fig. 5 is a cross-sectional view taken on the line 5—5 of Fig. 4, the thickness of the material being exaggerated for the sake of clarity;

Fig. 6 is a view similar to Fig. 5, but with the container in fully extended condition;

Fig. 7 is a top view of a portion of a container in partially completed condition;

Fig. 8 is a cross-sectional view taken on the line 8—8 of Fig. 7;

Fig. 9 is a view like that of Fig. 6, but showing a slightly modified form of container;

Figure 1:
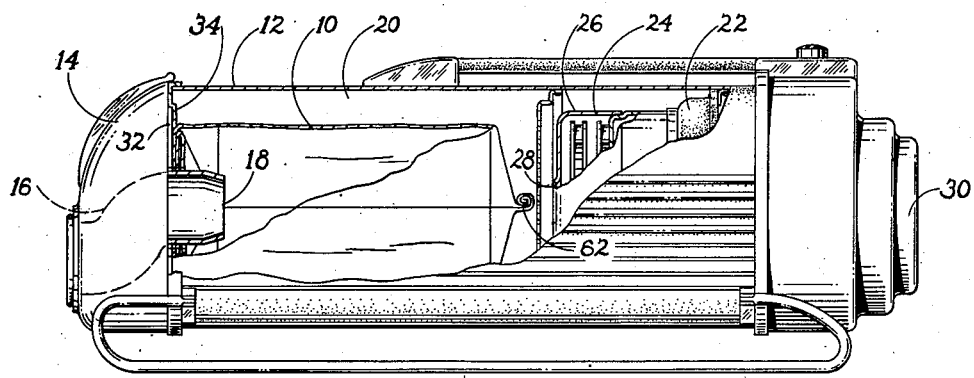
Fig. 1 is a side view, partially in cross-section, of a container in accordance with my invention in place in a vacuum cleaner.
Figure 2:
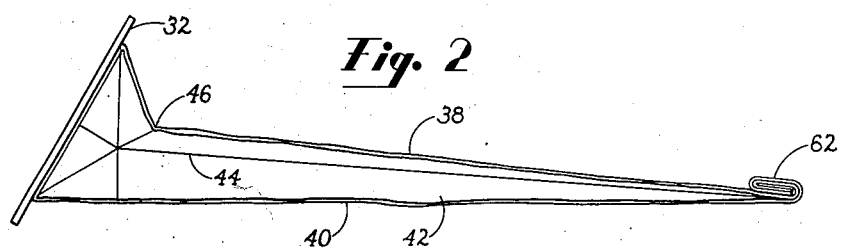
Fig. 2 is a side view of the container shown in Fig. 1, but in partially collapsed condition.

Referring more particularly to Fig. 1, reference character 10 designates a container in accordance with my invention in place within a vacuum cleaner. The cleaner includes a casing 12, the left-hand open end of which is normally closed by means of a removable cover 14 formed with an inlet passage 16 therethrough, to the outer end of which may be connected a flexible hose or the like for leading dust-laden air to the vacuum cleaner. The inner end of the passage 16 communicates with a nozzle member 18 which extends some distance into the space 20 within this end of the casing.

Mounted in the opposite end of the casing is an electric motor 22 which drives a fan 24 disposed within a fan housing 26. The housing is provided with inlet opening 28 and the air moved by the fan passes through or around the motor and out through an exhaust opening 30.

The container 10, which is made chiefly of porous material, preferably paper, also includes an end plate member 32 of relatively stiff material to which the flexible side walls are secured. This plate member extends laterally beyond the side walls so as to provide an outwardly extending flange at one end of the container. The casing 12 is formed with a flange 34 providing a seat against which the flange portion of the plate 32 is clamped by the closure member 14 when the latter is in place. The plate 32 is provided with a centrally located aperture 36 through which the nozzle member 18 extends when the cover 14 is in place, whereby dirt-laden air is introduced into the interior of the container 10. The air passes through the porous walls of the container to the inlet 28 of the fan, while the dirt is filtered from the air and remains within the container.

The flexible portion of the container is preferably made from an initially flat sheet of paper, folded to provide two pairs of side walls and having its opposite longitudinal edges joined by the glued seam 37. As shown in Figs. 2 through 6, the walls of one pair are designated by reference characters 38 and 40, the seam 37 being in the wall 38, and the walls of the other pair by reference characters 42 and 43.

Figure 3:
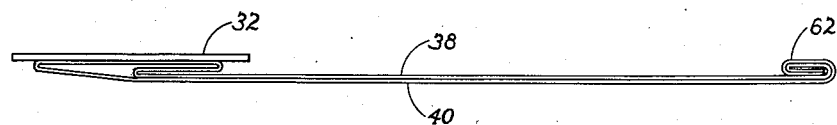
Fig. 3 is a side view of the container in fully collapsed condition.
Figure 4:
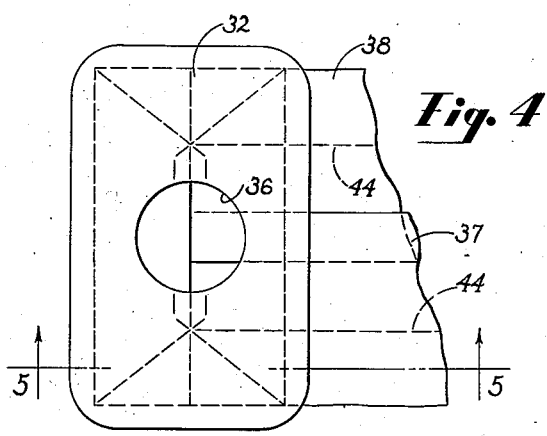
Fig. 4 is a top view of a portion of the container shown in Fig. 3.

As will appear from Fig. 4, the width of the side walls 38 and 40 is somewhat greater than that of the other pair, resulting in the plate member 32 being of rectangular shape, but all of the side walls could be of the same width. The end of each side wall is folded inwardly at substantially right angles to the respective wall, when the container is expanded, so as to provide flaps forming a flat end portion for the container, and the plate member 32 is glued to this flat end. In collapsed condition the wider side walls 38 and 40 lie flat with respect to each other, as is shown in Fig. 3, while the narrower walls of the other pair are each provided with a longitudinally extending center crease or fold line 44, shown in Figs. 2, 4 and 6, thus enabling these walls to be folded between the walls 38 and 40. One of the wider walls is provided with a transversely extending crease or fold line 46 which enables the plate member 32 to be folded flat with respect to the side walls when the container is collapsed so as to occupy the position shown in Figs. 3 and 4.

Fig. 5, which is a section taken on the line 5—5 of Fig. 4, shows the manner in which the walls are folded when the container is in fully collapsed condition. It will be seen that the upper side wall 38 is folded back along the transverse crease or fold line 46 and then inwardly at 47 to provide the flap 48 of the end portion of the container which is glued to the plate member 32. This flap is folded at 50 and 52 through 180° and thence extends parallel to the plate member to form the flap 53. Flap 53 is folded through 180° at 52a and 50a to form flap 54, which is integral with side wall 40, being folded at right angles thereto at 47a when the container is expanded.

The side wall 42, which when the container is in collapsed condition is folded double upon itself between the walls 38 and 40, and hence appears twice in the section of Fig. 5, is folded through 180° at 56 and 58 to form the connecting portion 60. It will be understood that the folded over flaps 48, 53 and 54 are glued to each other so as to form the closed end portion of the bag, and the plate member 32 is glued to the outer face of this end portion, and the aperture 36 extends through both the plate member and the otherwise closed end of the bag. However, the connecting portion 60 is not glued to any other portion, and when the container is expanded, this portion folds out to become part of the side wall 42 or 43. Due to the fact that the flaps 48, 53 and 54 as well as the portion 60 are integral with each other and the respective side walls, there is no open joint through which air could escape without passing through the pervious material of the container, and hence no possibility for leakage of dirt.

The aperture 36 is advantageously formed when the container is in the partially fabricated condition shown in Figs. 7 and 8, that is after the material has been folded to form the side walls, but before it has been folded to provide the end flaps. With the container in this flat condition, a semi-circular piece may be removed from the ends of the side walls 38 and 40 by a simple shearing operation. When these ends are thereafter folded at 47 and 47a to form the flaps 48 and 54, respectively, there results a circular aperture through the end of the container.

When the bag, shown in Fig. 5 in collapsed condition, is expanded it has the appearance shown in Fig. 6, the walls 38 and 40 being parallel to each other and the other two walls likewise being parallel to each other and substantially at right angles to the walls 38 and 40. Inasmuch as Fig. 6 is a sectional view, the side wall 42 is ahead of the section and not visible, while the other wall 43 of this pair appears in elevation.

The opposite end of the container may be closed in any suitable manner, and as is shown in Fig. 3, the closure is effected by folding over and gluing all four of the side walls when the container is in collapsed condition, as is shown at 62.

In the embodiment illustrated in Fig. 9 an inner plate member 64 of relatively stiff material is secured to the inner face of the end of the bag. Thus the folded end portions 48 and 54 of the side walls 38 and 40, respectively, are glued between the two stiff plate members 32 and 64. The presence of the inner plate member strengthens the joint between the end portion and the outer plate member, thus reducing the possibility of the flexible portion of the bag being torn away from the plate member. Obviously, the opening 36 extends through both of the plate members. In the event it is not desired to clamp the outwardly extending flange of the plate member 32 between the flange 34 and the cover 14 of the cleaner, the outer plate 32 of the embodiment shown in Fig. 9 may be omitted.

Figure 10:
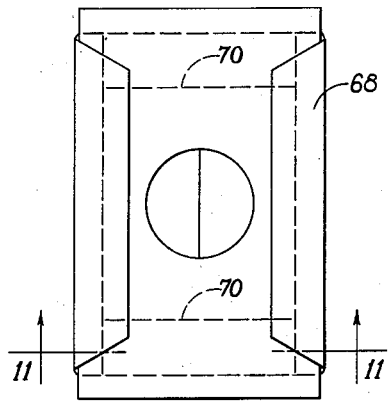
Fig. 10 is an end view of another modification.
Figure 11:
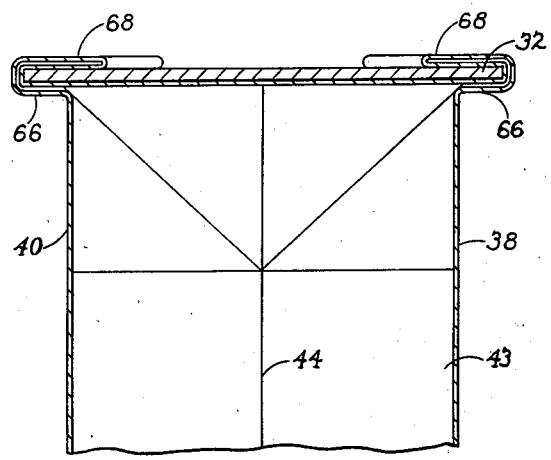
Fig. 11 is a cross-sectional view taken on the line 11—11 of Fig. 10.

In the embodiment illustrated in Figs. 10 and 11 the end flaps of the side walls 38 and 40, instead of being folded inwardly, are first folded outwardly as indicated at 66 and thence around the edge of the plate member 32 and back over the outer surface of the plate, as is shown at 68. As is indicated by the dotted line 70 in Fig. 10, the end flaps of the other pair of side walls are preferably folded inwardly in the same manner as they are in the embodiment illustrated in Figs. 1 through 6. The advantage of the arrangement shown in Figs. 10 and 11 resides in the fact that the glued joint between the end flaps of the side walls 38 and 40 and the end plate 32 is much stronger, due to the fact that the end portions of these walls are extended around the outer edges of the plate, than is the case when the flaps are folded inwardly. Thus, this embodiment possesses much of the advantage of that shown in Fig. 9, without requiring an inner plate member.

Figure 12:
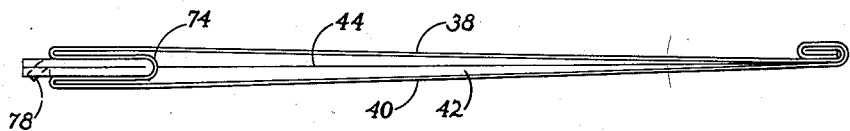
Fig. 12 is a side view of a still further modification, showing the container in fully collapsed condition.
Figure 13:
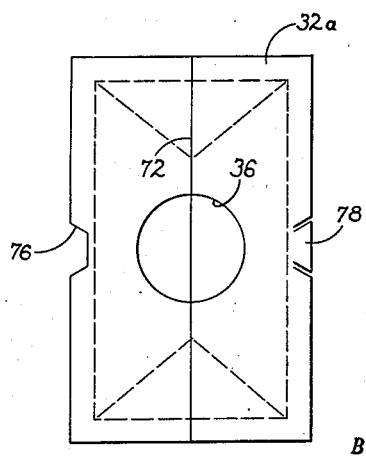
Fig. 13 is an end view of the container shown in Fig. 12, but in expanded condition.

In the embodiment illustrated in Figs. 12 and 13 the plate member of relatively stiff material, designated by reference character 32a, is formed with a hinge line 72. The wall portions 38, 40, 42 and 43 are secured to it in the same manner as described in Figs. 1 through 6, but the fold line 46 in the wall 38 is omitted. Instead, when the container is in collapsed condition the plate member 32a is folded double upon itself along the hinge line 72. This causes the pair of side walls 42 and 43 to fold along a line 74, which line extends transversely of the lengthwise extent of the container when the latter is collapsed.

During storage the container is collapsed to the condition shown in Fig. 12. When it is inserted in the cleaner the plate 32a is folded out to the flat position shown in Fig. 13 and when air flows into the bag the flexible walls are expanded to the same condition as is shown in Fig. 1. After the container has been filled with dirt and it is desired to remove it from the cleaner, the plate member 32a may be again folded over on itself, thus closing the opening 36 to prevent the leakage of dirt from the bag. The dirt within the bag of course prevents the side walls from returning to their collapsed position. As is shown, one edge of the plate 32a is formed with a notch 76, while the other edge is formed with a tongue 78, and this tongue may be forced into the notch so as to retain the plate member in folded over condition to thereby keep the opening 36 closed.

Figure 14:
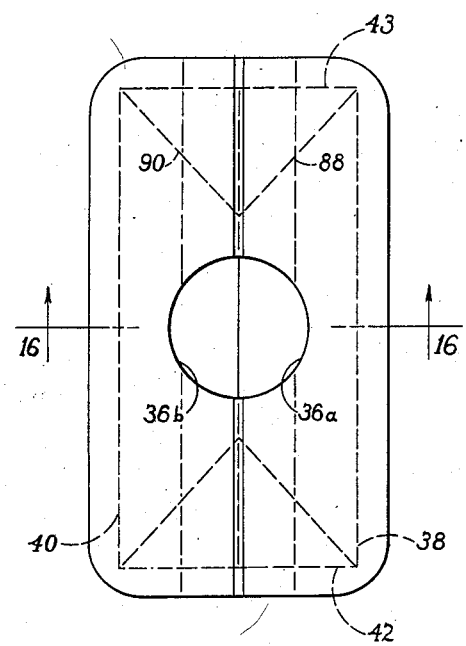
Fig. 14 is an end view of an additional modification of my invention, showing the container in expanded condition.
Figure 15:
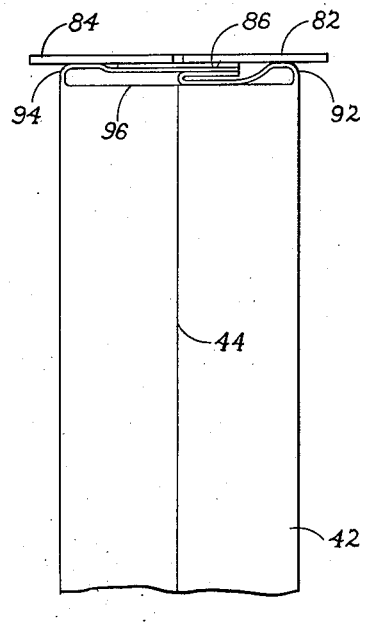
Fig. 15 is a side view of the container shown in Fig. 14.
Figure 16:
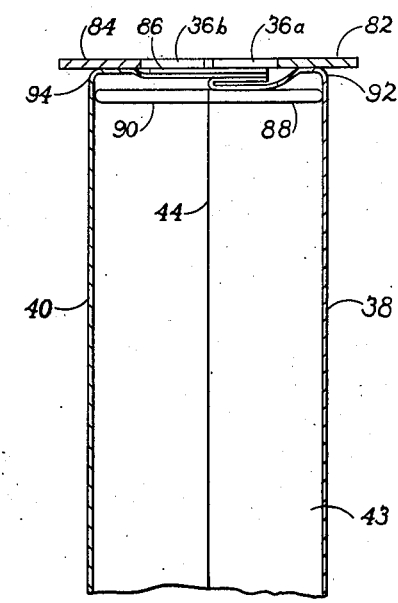
Fig. 16 is a cross-sectional view taken on the line 16—16 of Fig. 14.
Figure 17:
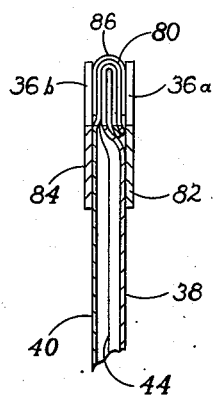
Fig. 17 is a cross-sectional view similar to Fig. 16, but showing the container in collapsed condition.

In the embodiment illustrated in Figs. 14 through 17 the end of the flexible container to which the plate member is secured, is closed by folding over and gluing the end portion when the container is in collapsed condition. Thus, as illustrated in Fig. 17, the side walls 38 and 40 are folded over as is shown at 80. The other pair of side walls 42 and 43, being folded inwardly between the walls 38 and 40, are also folded over, but they do not appear in the section along which Figs. 16 and 17 are taken, because this section is through the center of the container and hence inwardly from the fold lines 44. The plate structure comprises two relatively stiff members 82 and 84 which are joined together by being glued to a strip of flexible material 86 which acts as a hinge so as to provide a fold line. The container is shown in collapsed condition in Fig. 17, and in this condition the members 82 and 84 are folded back over and parallel to the side walls. Each member is glued to a respective side wall 38 or 40 over the whole area of the member with the exception of marginal bands around the outer edges, so that the members will extend beyond the side walls when the container is expanded to thus provide flange portions, as shown in Fig. 16.

In Figs. 14, 15 and 16 the container is shown in expanded condition, the members 82 and 84 having been hinged with respect to each other so as to lie in a single plane. At the same time, the side walls 38 and 40 have been separated from each other and the other pair of side walls 42 and 43 have been unfolded so as to be disposed at substantially right angles to the side walls 38 and 40. The lines 88 and 90 indicate the fold lines along which the end portions of the side walls 42 and 43 merge into the end portions of the side walls 38 and 40 when the container is in expanded condition. In this condition of the container, material forming an extension at the end of each of the four side walls is folded inwardly at substantially right angles to the respective wall to form the end portion to which the members 82 and 84 are secured, the walls 38 and 40 being folded along the lines 92 and 94, respectively, and the walls 42 and 43 along similar lines transverse to the lengthwise extent of the container, one of which is shown at 96 in Fig. 15. The material forming the extension of walls 38 and 40 is glued to the members 82 and 84, while that forming the extension of walls 42 and 43 is free up to the lines 88 and 90, where it merges with the extension of walls 38 and 40. Thus, when the container is collapsed, the side walls 42 and 43 unfold along the lines 96 and fold along the lines 44, so as to lie flat throughout their length between the other walls 38 and 40.

The members 82 and 84 are formed with semicircular recesses which, when the members are in the position shown in Figs. 14 and 15, form a circular opening which is in alignment with a similar opening which may be formed in the end of the flexible portion of the container in the same manner as has been previously described in connection with Figs. 7 and 8.

It will thus be seen that I have shown and described several embodiments of my invention. In each modification the container may be folded flat along straight fold lines and without bunching up of the paper in an unpredictable manner. This assures a minimum thickness of the container when in folded condition, thus reducing the space required for storage of the container. It is to be understood that the scope of my invention is not to be limited by the embodiments which have been shown by way of illustration, but is to be determined from the appended claim.

What I claim is:

A disposable extendable and collapsible dust bag for a suction cleaner, said bag being composed of pliable porous sheet material of porosity to permit the passage of air but to preclude the passage of dust particles therethrough, said bag having a plurality of pairs of side walls, the walls of each pair being substantially parallel to each other and disposed at an angle to the walls of any other pair when the container is in extended condition, the walls of at least one pair being provided with longitudinally extending center creases whereby said walls may be folded inwardly and flat with the remaining walls when the container is in collapsed condition, the sheet material forming an extension at one end of each side wall and being folded substantially at right angles to the respective wall when the container is in extended position to form a flat end portion, said end portion having an opening therethrough, a flat end member of relatively stiff material secured to said end portion and having an aperture communicating with said opening and with the interior of said bag, said end member being relatively rigid, at least one of said side walls having a fold line extending transversely of said bag and spaced from the fold where the extension joins said one side wall a distance equal to approximately one-half the width of said end portion whereby said end portion and end member are disposed parallel to said side walls when the bag is in collapsed condition, the end of said container opposite said end member being permanently closed.

EMIL ANDERSON.

REFERENCES CITED

The following references are of record in the file of this patent:

UNITED STATES PATENTS

| Number | Name | Date |
|---|---|---|
| 333,523 | Honiss | Jan. 5, 1886 |
| 401,687 | Claussen | Apr. 16, 1889 |
| 448,142 | Paige | Mar. 10, 1891 |
| 579,058 | Glover | Mar. 16, 1897 |
| 931,888 | Reaney et al. | Aug. 24, 1909 |
| 954,034 | Kahout | Apr. 5, 1910 |
| 1,704,773 | Spillane | Mar. 12, 1929 |
| 1,970,666 | Martinet | Aug. 21, 1934 |
| 2,022,941 | Rottman | Dec. 3, 1935 |
| 2,070,674 | Muentener | Feb. 16, 1937 |
| 2,115,802 | Dann | May 3, 1938 |
| 2,185,688 | Hargis | Jan. 2, 1940 |
| 2,225,389 | Osterdahl | Dec. 17, 1940 |
| 2,418,371 | Smellie | Apr. 1, 1947 |

FOREIGN PATENTS

| Number | Country | Date |
|---|---|---|
| 5,471 | Great Britain | Mar. 4, 1914 |